United States Patent
Kashihara (10) Patent No.: US 10,573,062 B2
(45) Date of Patent: Feb. 25, 2020

(54) METHOD AND SYSTEM FOR PROVIDING A VIRTUAL SPACE

(71) Applicant: COLOPL, Inc., Tokyo (JP)

(72) Inventor: Takao Kashihara, Ibaraki (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 16/170,042

(22) Filed: Oct. 25, 2018

(65) Prior Publication Data

US 2019/0102933 A1    Apr. 4, 2019

Related U.S. Application Data

(63) Continuation of application No. 15/423,761, filed on Feb. 3, 2017, now Pat. No. 10,127,713.

(30) Foreign Application Priority Data

Feb. 4, 2016    (JP) .................................. 2016-019777

(51) Int. Cl.
   *G06T 15/20*    (2011.01)
   *G06F 3/01*    (2006.01)
   *G06T 19/00*    (2011.01)

(52) U.S. Cl.
   CPC .............. *G06T 15/20* (2013.01); *G06F 3/011* (2013.01); *G06F 3/012* (2013.01); *G06T 19/006* (2013.01)

(58) Field of Classification Search
   None
   See application file for complete search history.

(56) References Cited

U.S. PATENT DOCUMENTS

| 2004/0145594 A1* | 7/2004 | Kobayashi ............. G06T 15/20 345/633 |
| 2014/0268356 A1* | 9/2014 | Bolas .................. G02B 27/0093 359/630 |

(Continued)

FOREIGN PATENT DOCUMENTS

| JP | 2012-257252 A | 12/2012 |
| JP | 5767386 B1 | 8/2015 |

OTHER PUBLICATIONS

Lin, James JW, et al. "Virtual guiding avatar: An effective procedure to reduce simulator sickness in virtual environments." Proceedings of the SIGCHI conference on Human factors in computing systems. ACM, 2004.*

(Continued)

*Primary Examiner* — Ryan M Gray
(74) *Attorney, Agent, or Firm* — Hauptman Ham, LLP (57) ABSTRACT

A method including defining a virtual space for immersing a user. The method further includes defining a field of view of a head mounted display. The method further includes generating an image of the field of view based on the virtual space that is visually recognizable by the user. The method further includes updating the image of the field of view in synchronization with movement of the head mounted display. The method further includes generating the image of the field of view including a guiding region which covers a part of the virtual space for guiding a sight line of the user when the image of the field of view is updated without synchronization with the movement of the head mounted display. The method further includes displaying the image of the field of view on the head mounted display.

17 Claims, 10 Drawing Sheets

(56) References Cited

U.S. PATENT DOCUMENTS

| | | | | |
|---|---|---|---|---|
| 2015/0352437 | A1* | 12/2015 | Koseki | A63F 13/212 463/31 |
| 2016/0025981 | A1* | 1/2016 | Burns | G02B 27/0093 345/156 |
| 2016/0364916 | A1* | 12/2016 | Terahata | G02B 27/017 |
| 2017/0053545 | A1* | 2/2017 | Yang | G06F 3/005 |
| 2017/0103574 | A1* | 4/2017 | Faaborg | G02B 27/0172 |
| 2017/0132845 | A1* | 5/2017 | Everman, II | G06T 19/006 |

OTHER PUBLICATIONS

Yao, Richard, et al. "Oculus vr best practices guide." Oculus VR 4 (2014).*

Sukunbo (Shun Kubota), "Unite 2015 Report, What you want to know to develop VR content with Gear VR", Online, Apr. 28, 2015, MoguraVR, <http://www.moguravr.com/unitegearvr/> 15pp.

Atsushi Yamamoto, "Experience the topic "virtual reality"! Watching Netflix and Hatsune Miku at Samsung "Gear VR"", Online, Dec. 26, 2015, <http://www.phileweb.com/review/article/201512/26/1934.html> 13pp.

Office Action in JP Application No. 2016-019777, dated Jul. 26, 2016. 8pp.

Office Action in JP Application No. 2016-019777, dated Nov. 8, 2016. 7pp.

Aueki, "[CEDEC 2015] What should be 'avoided' in VR? Oculus VR teaches a technique for comfort VR content production," [online], Aug. 22, 2015, 4Gamer.net, Internet <URL:http://www.4gamer.net/games/195/G019528/20150828092/>, Aetas, Inc. 20pp.

Scsioverdrive. "VR Training in Tuscany, for those with simulation sickness", [online]May 16, 2013, https://forums.oculus.com/viewtopic.php?t=1545/, 3pp.

James JW et al. "Virtual guiding avatar: An effective procedure to reduce simulator sickness in virtual environments." CHI, Apr. 24-29, 2004. p. 719-p. 726 vol. 6 No. 1, ACM, Vienna, Austria. 8pp.

Richard Yao et al. "Oculus VR best practices guide." Oculus VR, LLC, Jul. 23, 2014. p. 1-51. 51pp.

\* cited by examiner

METHOD AND SYSTEM FOR PROVIDING A VIRTUAL SPACE

RELATED APPLICATIONS

The present application is a continuation of U.S. patent application Ser. No. 15/423,761 filed Feb. 3, 2017, which claims priority to Japanese Application Number 2016-019777, filed Feb. 4, 2016, the disclosure of which is hereby incorporated by reference herein in its entirety.

BACKGROUND

This disclosure relates to a method and system for providing, to a head mounted display, a virtual space in which a user is immersed.

In Japanese Patent No. 5,767,386, the following head mounted display system is disclosed. While an application is running, the head mounted display system performs processing of changing display of an image in a virtual space, which is displayed in a user's visual field in synchronization with movement of a head of a user wearing a head mounted display (hereinafter also referred to as "HMD"). Meanwhile, the display of the image in the virtual space can be changed with use of a controller that is connected to the HMD so as to be capable of communicating to/from the HMD.

In the head mounted display system as disclosed in Japanese Patent No. 5,767,386, when a visual-field image that is visually recognized by the user is updated by changing a position and a direction of a virtual camera that defines the virtual space image of the field of view. As disclosed in "[CEDEC 2015] What should be 'avoided' in VR? Oculus VR teaches a technique for comfort VR content production," [online], Aug. 22, 2015, 4Gamer.net, [search on Jan. 13, 2016], Internet <URL:http://www.4gamer.net/games/195/G019528/20150828092/>, when the virtual camera is moved backward, moved at high speed, or moved in a curved motion, the user is more susceptible to the VR sickness.

SUMMARY

This disclosure includes a method and system for providing a virtual space, which are capable of reducing VR sickness without reducing a user's sense of immersion to a virtual space.

According to at least one embodiment of this disclosure, there is provided a method of providing, to a head mounted display of a non-transmissive type (or partially transmissive), a virtual space in which a user is immersed. The method includes generating a visual-field image that is visually recognizable by the user in a virtual space image forming the virtual space. The method further includes updating the image of the field of view in synchronization with movement of the head mounted display. The method further includes generating, when the image of the field of view is updated without synchronization with the movement of the head mounted display, a sight line guiding region for guiding a sight line of the user, and displaying the sight line guiding region and the image of the field of view on the head mounted display such that the sight line guiding region covers a part of the image of the field of view.

Further, according to at least one embodiment of this disclosure, there is provided a system for causing a computer to execute the method of providing the virtual space described above.

According to this disclosure providing the virtual space, which is capable of reducing VR sickness without reducing the user's sense of immersion to the virtual space is possible.

DETAILED DESCRIPTION

Contents of at least one embodiment of this disclosure are described and include a method and a system for providing a virtual space according to at least one embodiment of this disclosure have the following configurations.

(Item 1)

A method of providing a virtual space according to an embodiment is a method of providing, to a head mounted display of a non-transmissive type, a virtual space in which a user is immersed. The method includes generating a visual-field image that is visually recognizable by the user in a virtual space image forming the virtual space. The method further includes updating the image of the field of view in synchronization with movement of the head mounted display. The method further includes generating, when the image of the field of view is updated without synchronization with the movement of the head mounted display, a sight line guiding region for guiding a sight line of the user, and displaying the sight line guiding region and the image of the field of view on the head mounted display such that the sight line guiding region covers a part of the image of the field of view.

With this configuration, when the image of the field of view is updated with use of, for example, an external controller or through specific scene change without synchronization with the movement of the head mounted display, the sight line guiding region for guiding the sight line of the user is displayed. Therefore, an amount of information that enters the brain of the user is reduced. With this, VR sickness of the user is reduced in some instances. Further, while the image of the field of view is displayed, the sight line guiding region is displayed so as to overlap with a part of the image of the field of view. Therefore, the user's sense of immersion to the virtual space is maintained.

(Item 2)

In at least one embodiment, the updating the image of the field of view is carried out by changing a position and/or a direction of a virtual camera defining the image of the field of view.

Examples of the update of the image of the field of view include changing the direction of the virtual camera without moving the position thereof, moving the position of the virtual camera without changing the direction thereof, and moving the position of the virtual camera while changing the direction thereof.

(Item 3)

In at least one embodiment, the sight line guiding region is displayed so as to cover a half or more of the image of the field of view.

With this configuration, the visual effect of guiding the sight line of the user can be sufficiently obtained, and the VR sickness can be reliably prevented.

(Item 4)

In at least one embodiment, the sight line guiding region is generated in a size extending to an outer side of a region of the image of the field of view in the virtual space.

Assuming a case where the image of the field of view is updated by changing the direction of the virtual camera in synchronization with the movement of the head mounted display, as in the above-mentioned configuration, in at least one embodiment, the sight line guiding region is extended to the outside of the region of the image of the field of view.

(Item 5)

In at least one embodiment, the sight line guiding region includes a sight line concentrating object on which the sight line of the user is focused.

In at least one embodiment, the sight line concentrating object is configured to give, to the user, such a visual effect that the user is moved in the virtual space in a direction of change of the position and/or the direction of the virtual camera.

With this configuration, the sight line concentrating object can provide such a visual effect that the user himself/herself feels like being moved in a predetermined direction, and hence the predictability of the user is enhanced to cause less VR sickness.

(Item 6)

In at least one embodiment, arranging the sight line concentrating object also outside of a region of the image of the field of view in the virtual space.

Assuming a case where the image of the field of view is updated by changing the direction of the virtual camera in synchronization with the movement of the head mounted display, as in the above-mentioned configuration, in at least one embodiment, the sight line concentrating object is arranged also outside of the region of the image of the field of view.

(Item 7)

A system according to at least one embodiment is a system for causing a computer to execute the method of any one of Items 1 to 6.

With this configuration, providing the system capable of reducing VR sickness without reducing the user's sense of immersion to the virtual space provided on the head mounted display is possible.

Some examples of a method of providing a virtual space to an HMD and a program for causing a computer to execute the method according to at least one embodiment of this disclosure are described below with reference to the drawings. The virtual space is herein a three-dimensional virtual space, but this disclosure is not necessarily limited thereto. This disclosure is not limited to those examples, and is defined by the scope of claims. This disclosure is intended to include all modifications within the scope of claims and the equivalents thereof. In the following description, like elements are denoted by like reference symbols in the description of the drawings, and redundant description thereof is omitted.

Figure 1:
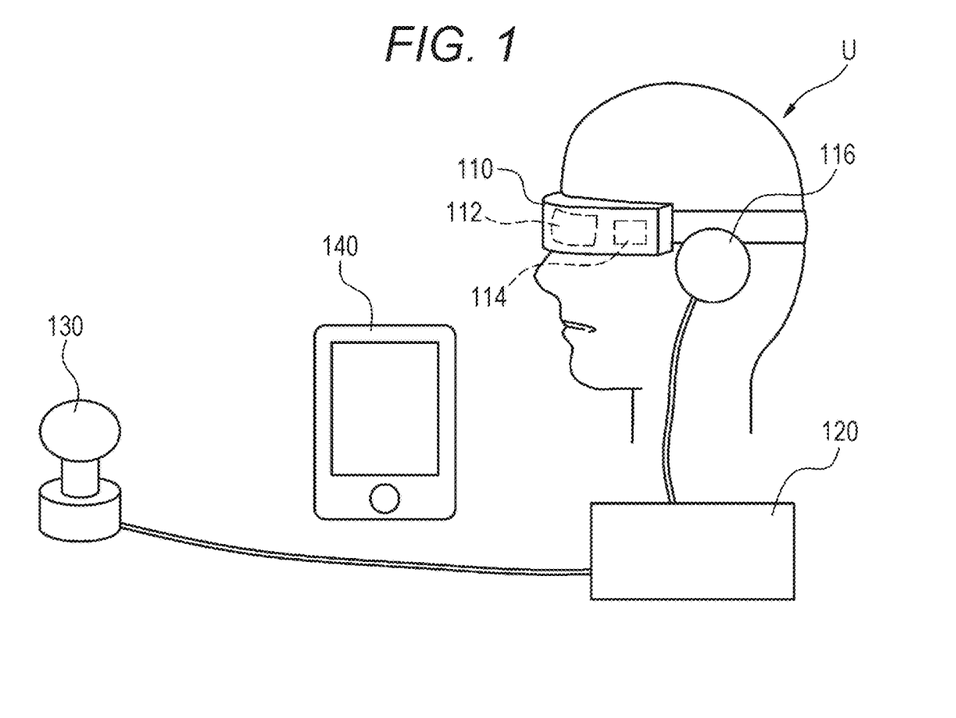
FIG. 1 is a schematic view of a configuration of an HMD system according to at least one embodiment of this disclosure.
Figure 2:
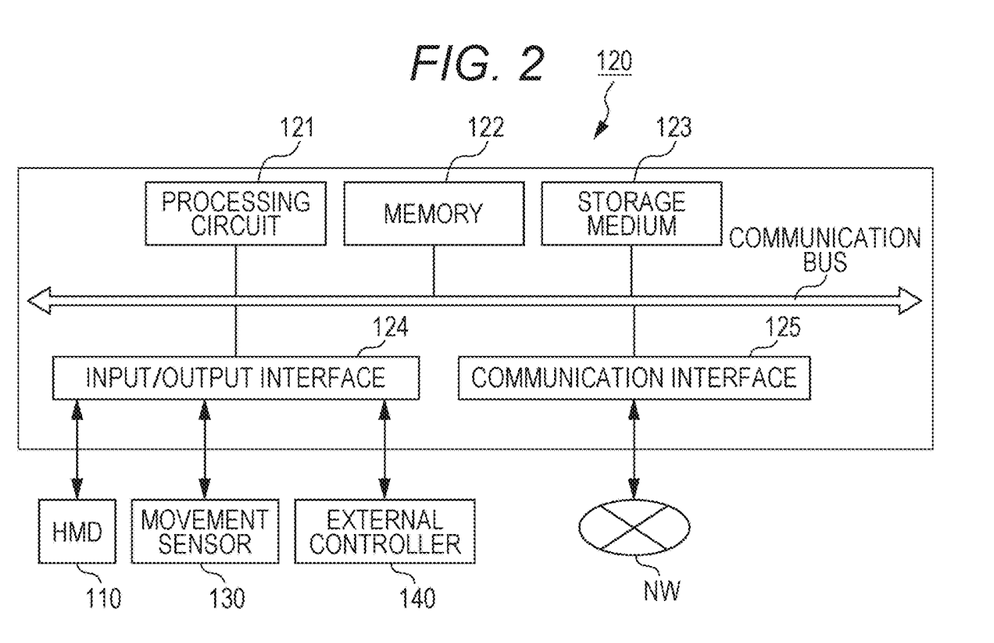
FIG. 2 is a block diagram of a hardware configuration of a control circuit unit included in the HMD system of FIG. 1.

FIG. 1 is a schematic view of a configuration of an HMD system using an HMD according to at least one embodiment. FIG. 2 is a block diagram of a hardware configuration of a control circuit unit included in the HMD system of FIG. 1.

As illustrated in FIG. 1, an HMD system 100 includes an HMD 110 that is wearable on a head of a user U, a control circuit unit 120, a movement sensor 130, and an external controller 140.

The HMD 110 includes a display unit 112, an HMD sensor 114, and headphones 116. In at least one embodiment, the headphones 116 are not included in the HMD 110, and a speaker and headphones that are independent of the HMD 110 are usable.

The display unit 112 includes a non-transmissive, or partially transmissive, display device configured to completely cover a field of view (visual field) of the user U wearing the HMD 110. With this, the user U is able to see only a screen displayed on the display unit 112. That is, the user U loses the visual field of the external world, and hence the user U is immersed in a virtual space displayed on the display unit 112 by an application executed by the control circuit unit 120.

The HMD sensor 114 is mounted near the display unit 112 of the HMD 110. The HMD sensor 114 includes at least one of a geomagnetic sensor, an acceleration sensor, or an inclination (angular velocity or gyro) sensor, and is able to detect various movements of the HMD 110 worn on the head of the user U.

The movement sensor 130 includes, for example, a position tracking camera (position sensor). The movement sensor 130 is connected to the control circuit unit 120 so as to be capable of communicating to/from the control circuit unit 120, and has a function of detecting information relating to positions or inclinations of a plurality of detection points (not shown) provided on the HMD 110. The detection points are, for example, light emitting portions configured to emit infrared light or visible light. The position tracking camera serving as the movement sensor 130 includes an infrared sensor or a plurality of optical cameras and detecting the detection points of the HMD 110. The control circuit unit 120 is configured to acquire information of the position of the HMD 110 from the movement sensor 130, to thereby accurately associate a position of a virtual camera in the virtual space with the position of the user U wearing the HMD 110 in the real space.

The HMD system includes at least one of the HMD sensor 114 or the movement sensor 130 for detecting the movement of the HMD 110. In at least one embodiment, when the movement of the HMD 110 is sufficiently detected with use of any one of the sensors, the other sensor may be omitted.

The control circuit unit 120 is configured as hardware (computers such as a personal computer and a server computer connected via a network) separable from the HMD 110. In at least one embodiment, the control circuit unit 120 is integrated with the HMD 100. As illustrated in FIG. 2, the control circuit unit 120 includes a processing circuit 121, a memory 122, a storage medium 123, an input/output interface 124, and a communication interface 125, which are connected to each other via a communication bus serving as a data transmission path. In at least one embodiment, the control circuit unit 120 may be mounted inside the HMD 110. Further, in at least one embodiment, only a part of the functions of the control circuit unit 120 may be mounted on the HMD 110, and the remaining functions may be mounted on hardware different from the HMD 110.

The processing circuit 121 includes various processors such as a central processing unit (CPU), a micro-processing unit (MPU), and a graphics processing unit (GPU), and has a function of controlling the entire control circuit unit 120 and HMD system 100.

The memory 122 includes volatile storage devices, such as a read only memory (ROM) and a random access memory (RAM), and is configured to temporarily store programs to be used by the processing circuit 121 and control data such as calculation parameters.

The storage medium 123 includes non-volatile storage devices such as a flash memory and a hard disk drive (HDD), and is configured to store user authentication programs, game programs including data relating to various images and objects, and other programs. The storage medium 123 may further construct a database including tables for managing various kinds of data.

The input/output interface 124 includes various connection terminals such as a universal serial bus (USB) terminal, a digital visual interface (DVI) terminal, and a high-definition multimedia interface (HDMI) (trademark) terminal, and various processing circuits for wireless connection. The input/output interface 124 is configured to connect the HMD 110, the movement sensor 130, the external controller 140, and the like to each other.

The communication interface 125 includes various wire connection terminals for communicating to/from an external device via a network NW, and various processing circuits for wireless connection. The communication interface 125 is configured to adapt to various communication standards for communication via a local area network (LAN) or the Internet.

The control circuit unit 120 is configured to execute an application stored in the memory 122 or the storage medium 123, to thereby present a virtual space on the display unit 112 of the HMD 110. With this, the HMD 110 is able to execute an operation for immersing the user U in a three-dimensional virtual space (VR space).

The external controller 140 is a general user terminal, and is, for example, a game console. In addition, in at least one embodiment, the external controller 140 is a portable device including a touch display, e.g., a smart phone, a personal digital assistant (PDA), a tablet computer, or a notebook personal computer (PC). The external controller 140 includes a central processing unit (CPU), a main storage, an auxiliary storage, a transmitting/receiving unit, a display unit, and an input unit, which are connected to each other via a bus, in at least one embodiment. The user U wearing the HMD 110 is able to perform input, e.g., touch operation, to the external controller 140, to thereby give various operation instructions to the virtual space.

Figure 3:
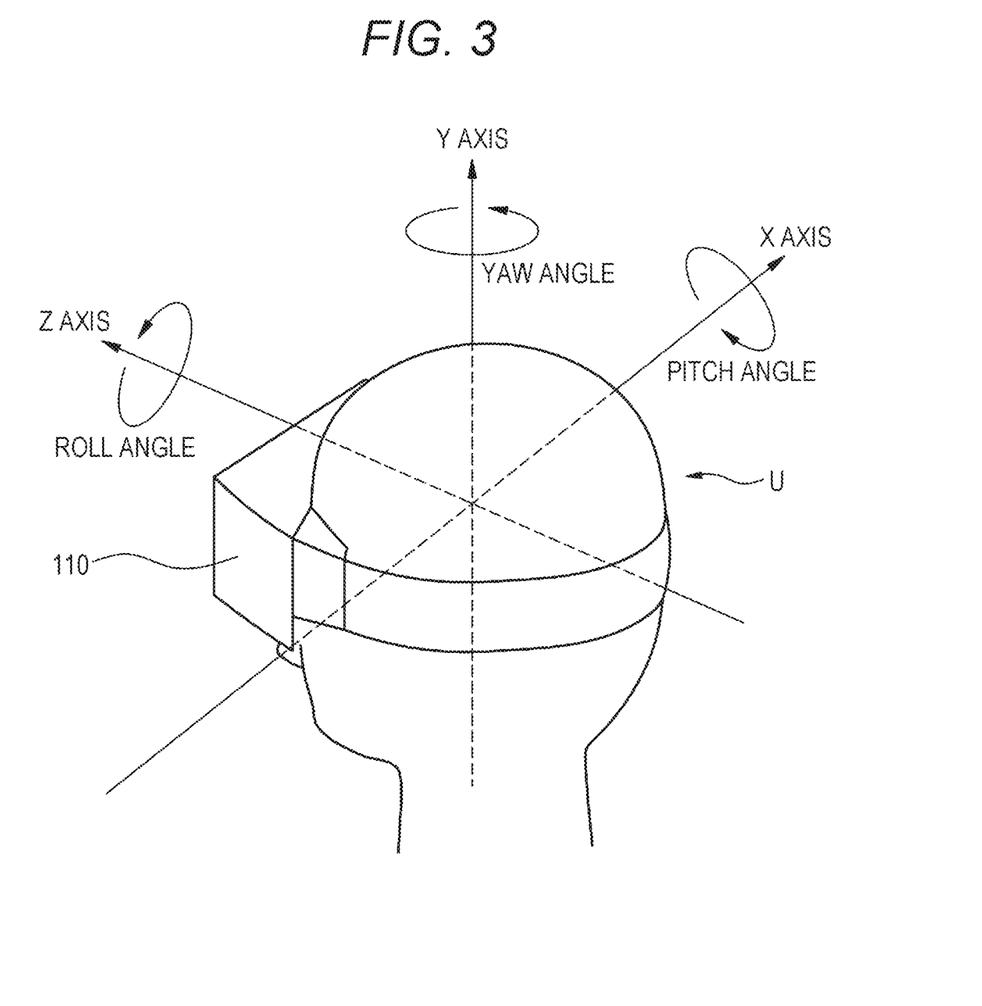
FIG. 3 is a diagram of an orthogonal coordinate system on a three-dimensional space defined about a head of a user wearing an HMD.

Next, with reference to FIG. 3, description is given of a method of acquiring information relating to the position and the inclination (direction of visual axis) of the HMD 110. The information relating to the position and the inclination of the HMD 110, which is based on the movement of the head of the user U wearing the HMD 110, can be detected by the movement sensor 130 and/or the HMD sensor 114 mounted on the HMD 110. As illustrated in FIG. 3, a three dimensional coordinate system (XYZ coordinates) is defined about the head of the user U wearing the HMD 110. A perpendicular direction in which the user U stands upright is defined as a Y axis, a direction being orthogonal to the Y axis and connecting between the user U and the center of the display unit 112 is defined as a Z axis, and a direction orthogonal to the Y axis and the Z axis is defined as an X axis. The movement sensor 130 and/or the HMD sensor 114 are/is configured to detect angles about the respective axes (that is, inclination determined by a yaw angle representing rotation about the Y axis, a pitch angle representing rotation about the X axis, and a roll angle representing rotation about the Z axis), and the control circuit unit 120 is configured to determine angle (inclination) information data for controlling the virtual camera that defines the visual field information based on the temporal change of the angles.

Figure 4A:
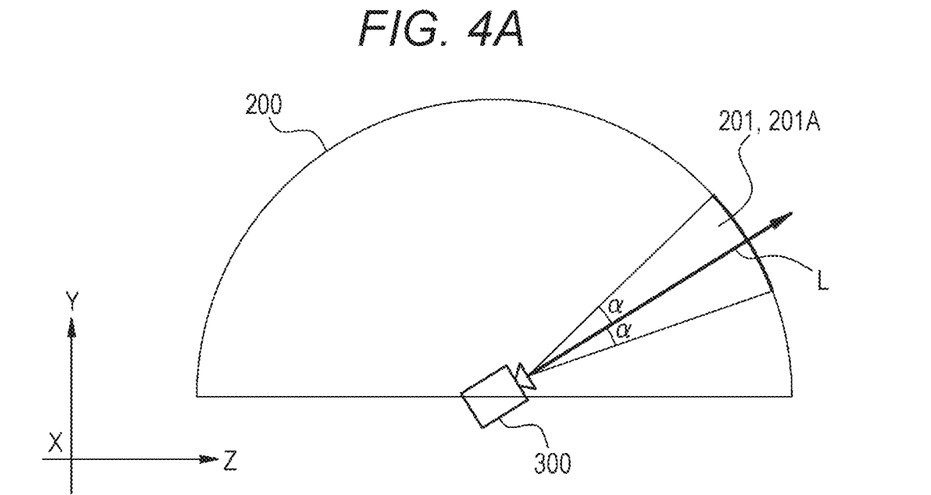
FIG. 4A is a YZ plane diagram of at least one example of a virtual space and a virtual camera.
Figure 4B:
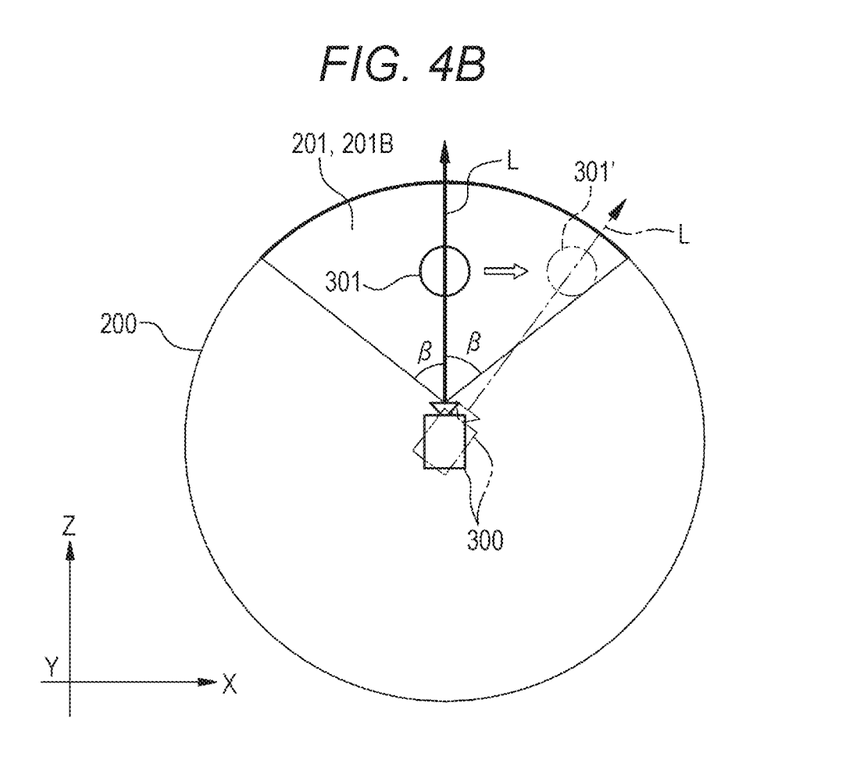
FIG. 4B is an XZ plane diagram of at least one example of the virtual space and the virtual camera.

FIG. 4A is a YZ plane diagram for illustrating an example of a virtual space and a virtual camera, and FIG. 4B is an XZ plane diagram for illustrating an example of the virtual space and the virtual camera. Further, FIG. 4B is an illustration of a case where the virtual camera is moved in synchronization with the movement of the HMD 110.

As illustrated in FIG. 4A and FIG. 4B, a virtual camera 300 is arranged inside a virtual space 200. In at least one example, the virtual camera 300 is arranged at the center of the virtual space 200. A field of view region (visual region of the virtual space 200 that is visually recognizable by the user) is defined based on the position and the direction of the virtual camera 300 in the virtual space 200. The field of view region 201 is determined based on a sight line reference sight line L of the virtual camera 300. The field of view 201 has a first region 201A defined as a range including a polar angle α with the reference sight line L being the center in the YZ plane illustrated in FIG. 4A, and a second region 201B defined as a range including an azimuth R with the reference sight line L being the center in the XZ plane illustrated in FIG. 4B. An image of the field of view that is visually recognizable by the user is generated based on the field of view region 201. The image of the field of view includes two two-dimensional images for being recognized by right and left eyes respectively. The two-dimensional images for the right and left eyes are displayed on the display unit 112 of the HMD 110, and thus the two-dimensional images are provided to the user as a three-dimensional image.

When the movement of the virtual camera 300 is controlled in synchronization with the movement of the HMD 110, the movement of the HMD 110 in the real space is associated with the movement of the virtual camera 300 in the virtual space 200 such that the sight line reference sight line L of the virtual camera 300 corresponds to the Z-axis direction (see FIG. 3) of the three-dimensional coordinate system of the HMD 110. For example, as illustrated in FIG. 4B, when the user wearing the HMD 110 is looking at an object 301 (solid line) arranged in the virtual space 200, the direction of the virtual camera 300 is set to a position at which the sight line reference sight line L intersects with the object 301. For example, when the user moves his/her head such that the sight line is directed to the right side as the object 301 is moved to the right side along the horizontal direction in the virtual space, as indicated by the broken line of FIG. 4B, the direction of the virtual camera 300 is changed to the position at which the reference sight line L intersects with the object 301' (broken line) in synchronization with the movement of the HMD 110, and the field of view region 201 (201B) is changed as well. When the field of view region 201 is changed, the image of the field of view that is visually recognizable by the user is changed as well.

Meanwhile, the field of view region 201 of the virtual camera 300 (that is, the position and/or the direction of the virtual camera 300) is controllable without synchronization with the movement of the HMD 110. For example, the position and/or the direction of the virtual camera 300 is changed based on the input to the external controller 140, in some instances. Further, depending on the content using the virtual space, in some cases, the virtual camera 300 automatically moves in the virtual space 200 to change the field of view region 201 under a state in which there is no movement of the HMD 110 or no input to the external controller 140.

Figure 5:
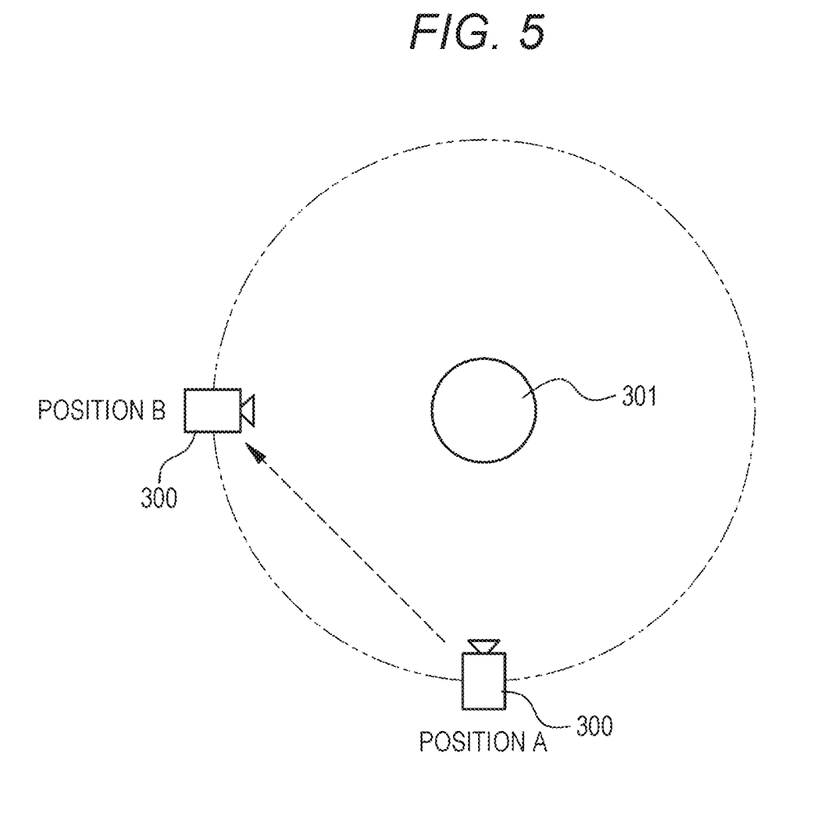
FIG. 5 is a diagram of at least one example of the movement of the virtual camera when a visual-field image is updated without synchronization with the movement of the HMD.
Figure 6:
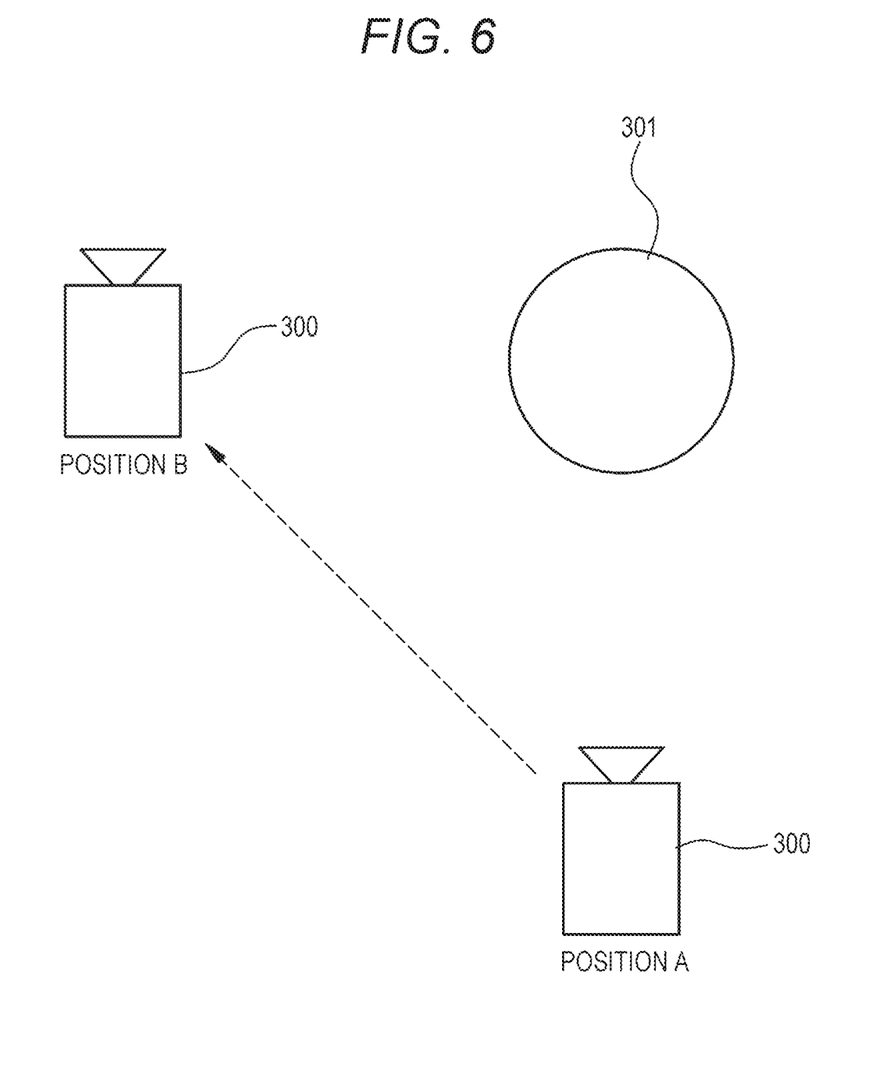
FIG. 6 is a diagram of at least one example of the movement of the virtual camera when the image of the field of view is updated without synchronization with the movement of the HMD.

FIG. 5 and FIG. 6 are examples of the movement of the virtual camera in a case where the field of view region of the virtual camera is controlled without synchronization with the movement of the HMD.

In FIG. 5, the virtual camera 300 is arranged at a position A and directed toward the object 301 arranged in the virtual space. In this case, when the user performs input for controlling the virtual camera 300 to the external controller 140, the virtual camera 300 is moved clockwise to a position B by, for example, being turned about the object 301. With this, the virtual camera 300 is turned clockwise by 90° about the object 301 to be moved from the position A being the initial point to the position B being the destination point, and the virtual camera 300 is controlled to be directed toward the object 301. Along with the change of the field of view region due to the turning movement of the virtual camera 300, the image of the field of view to be displayed on the display unit 112 is changed.

The movement of the virtual camera 300 is not limited to the turning movement illustrated in FIG. 5, and may be parallel movement from the position A to the position B as illustrated in FIG. 6. In this case, the position to which the virtual camera 300 is moved is similar to that in the case illustrated in FIG. 5, but the direction of the virtual camera 300 is controlled to be the same between the position A and the position B. That is, at the position B, the virtual camera 300 is not directed toward the object 301.

In at least one embodiment, when the image of the field of view is updated based on the movement of the virtual camera 300 arranged in the virtual space 200, different methods are employed for updating the image of the field of view between the case where the virtual camera 300 is moved in synchronization with the movement of the HMD 110 and the case where the virtual camera 300 is moved without synchronization with the movement of the HMD 110. In the case where the virtual camera 300 is moved in synchronization with the movement of the HMD 110, in a transition period of moving the virtual camera 300 from the position A to the position B, the control circuit unit 120 generates a continuous image of the field of view for a period in which the virtual camera 300 is moved from the position A to the position B, and causes the display unit 112 to display the continuous image of the field of view. Meanwhile, in the case where the virtual camera 300 is moved without synchronization with the movement of the HMD 110, when the virtual camera 300 is moved from the position A to the position B, the control circuit unit 120 generates a guiding region for attracting the sight line of the user together with the continuous image of the field of view for the period in which the virtual camera 300 is moved from the position A to the position B, and causes the display unit 112 to display the guiding region for covering a part of the virtual space in the field of view.

Figure 7:
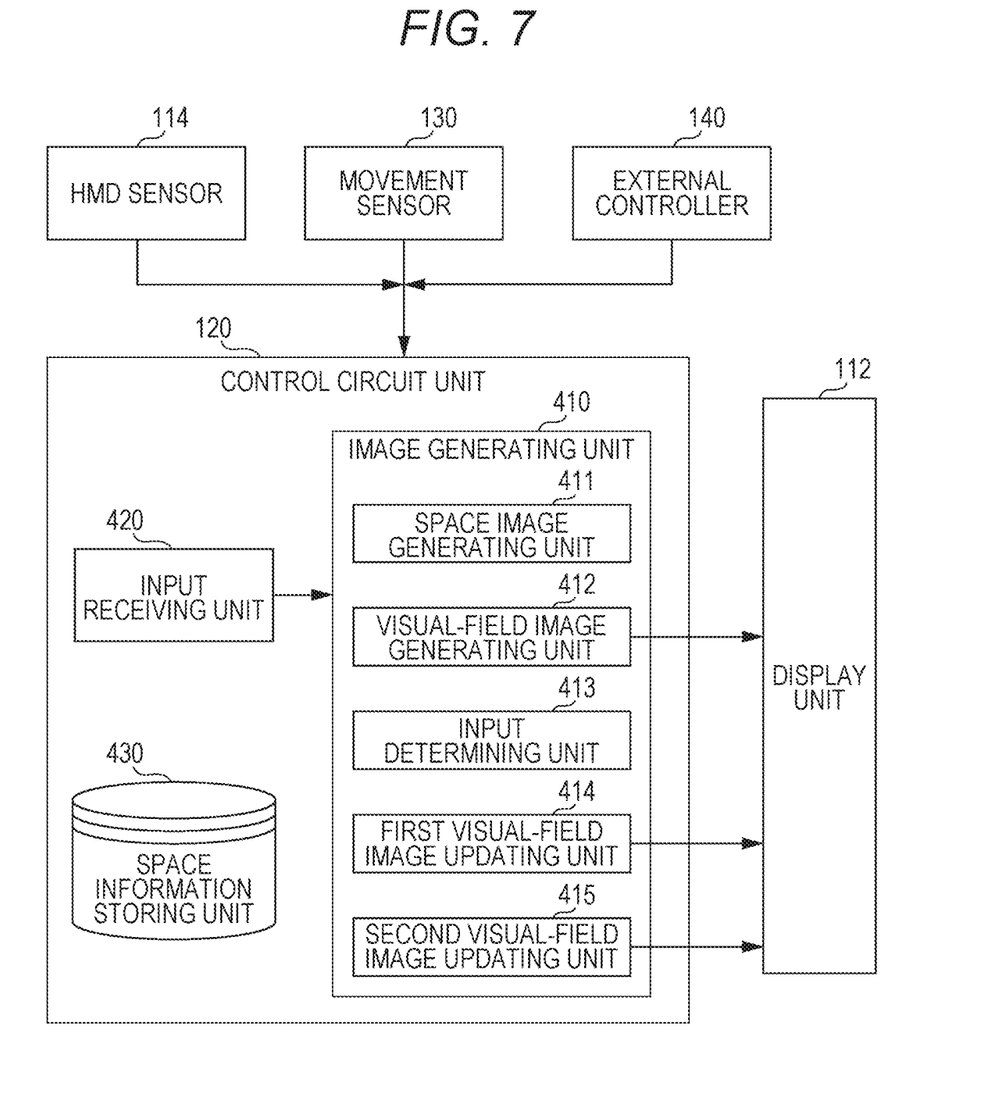
FIG. 7 is a block diagram of the function of the control circuit unit, for achieving the configuration of at least one embodiment.

FIG. 7 is a block diagram of hardware implemented functionality of the control circuit unit 120, for achieving the processing of displaying the virtual space 200, in particular, the processing of updating the image of the field of view in the HMD system 100. The control circuit unit 120 is configured to control an image to be output to the display unit 112 based on the input from the HMD sensor 114, the movement sensor 130, and the external controller 140.

As illustrated in FIG. 7, the control circuit unit 120 includes an image generating unit 410, an input receiving unit 420, and a space information storing unit 430. The image generating unit 410 includes a space image generating unit 411, a visual-field image generating unit 412, an input determining unit 413, a first visual-field image updating unit 414, and a second visual-field image updating unit 415.

Figure 8:
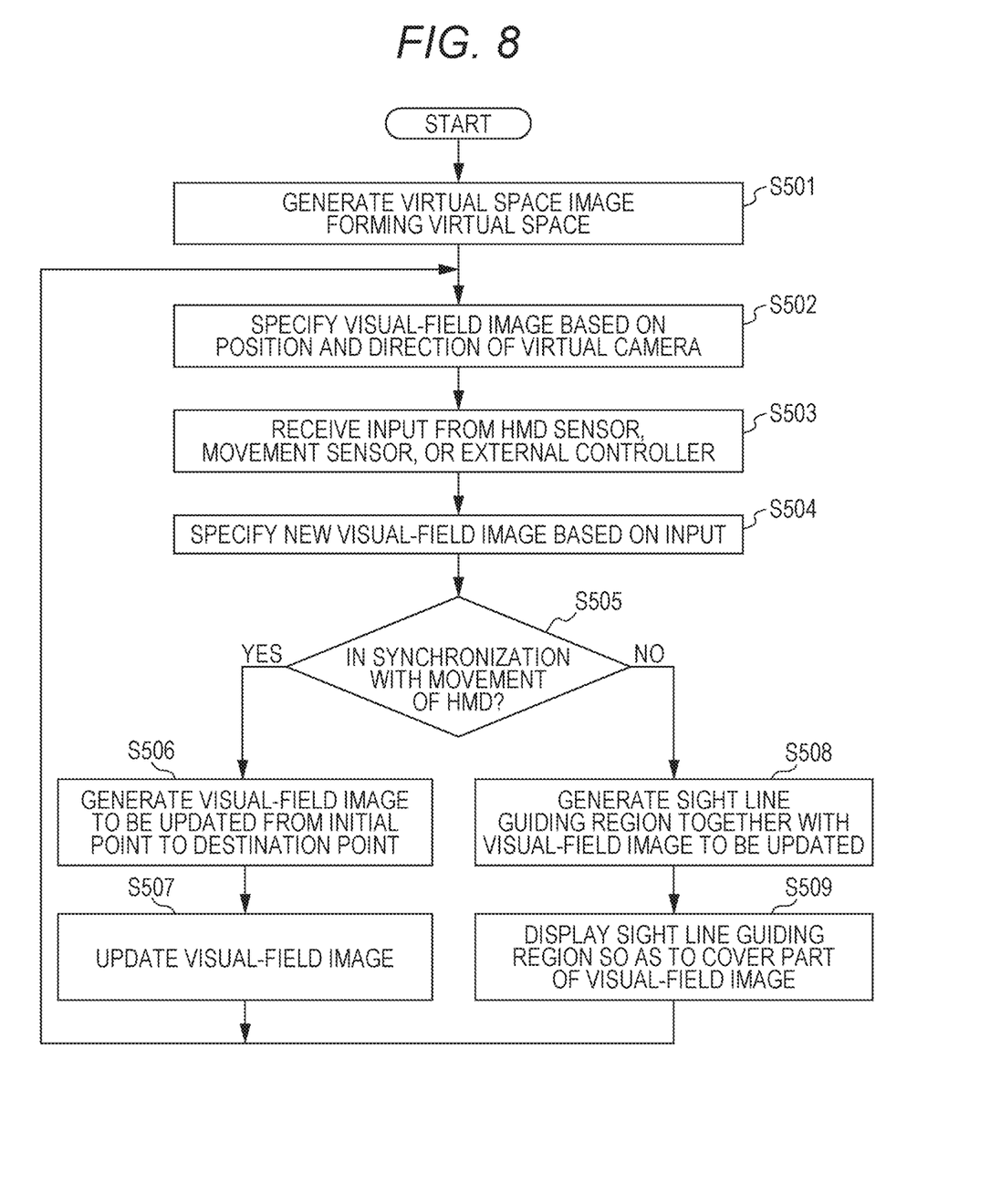
FIG. 8 is a flow chart of a method of processing in the HMD system according to at least one embodiment.
Figure 9:
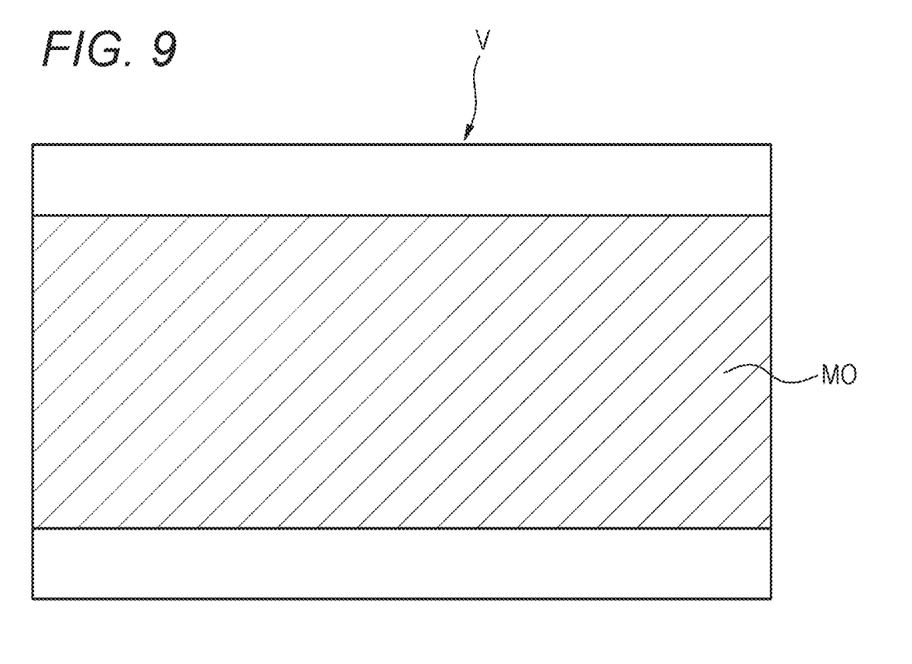
FIG. 9 is a diagram of a display example of a sight line guiding region to be displayed on the HMD according to at least one embodiment.
Figure 10:
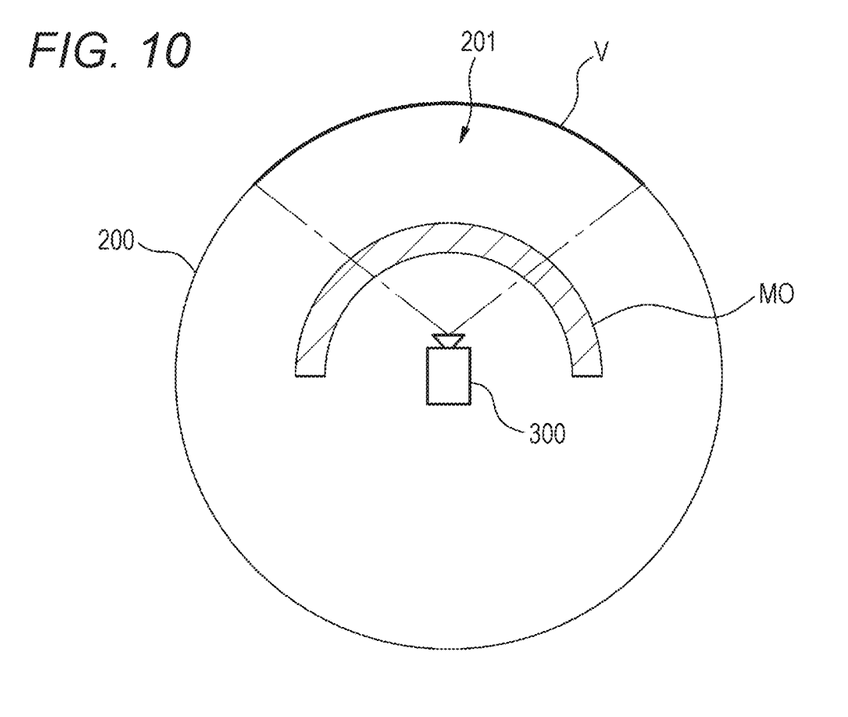
FIG. 10 is a diagram of an additional configuration of the sight line guiding region illustrated in FIG. 9.

FIG. 8 is a flow chart of a method of processing of updating the image of the field of view according to at least one embodiment. FIG. 9 is a diagram of at least one example in which the guiding region is displayed on a part of the field of view. FIG. 10 is an illustration of an additional configuration of the guiding region illustrated in FIG. 9.

As illustrated in FIG. 8, first, in the image generating unit 410, the space image generating unit 411 refers to the space information storing unit 430, to thereby generate a virtual space image on a celestial sphere defining the virtual space 200 in which the user is immersed (Step S501). In the image generating unit 410, the unit 412 specifies the position and the direction of the virtual camera 300 at the initial point (for example, the position A of FIG. 5 or FIG. 6) of the virtual camera 300 arranged in the virtual space 200, and specifies the image of the field of view that is visually recognizable by the user based on the specified position and direction of the virtual camera 300 (Step S502).

Next, the input receiving unit 420 receives the input from the HMD sensor 114, the movement sensor 130, and the external controller 140 as input for moving the position and/or the direction of the virtual camera 300 from the initial point (Step S503).

Next, the unit 412 specifies a new position and a new direction of the virtual camera 300 at the point (for example, the position B of FIG. 5 or FIG. 6) where the virtual camera 300 should be located, based on the input received by the input receiving unit 420. Then, the unit 412 specifies a new image of the field of view at a destination point based on the position and the direction of the virtual camera 300 at the moving destination (Step S504).

Depending on the content, in some cases, the virtual camera 300 automatically moves in the virtual space independent of the movement of the HMD 110 or the input of the external controller 140. In those cases, Step S504 is executed by calculating the new position and the new direction of the virtual camera at the moving destination independently of the input.

Next, the input determining unit 413 determines whether the virtual camera 300 is moved in synchronization with the movement of the HMD 110 (Step S505). That is, the input determining unit 413 determines whether the input in Step S503 is input from the HMD sensor 114 and/or the movement sensor 130 or input from the external controller 140.

When the input determining unit 413 determines that the input in Step S503 is input for moving the virtual camera 300 in synchronization with the movement of the HMD 110 (that is, input from the HMD sensor 114 and/or the movement sensor 130) (Step S505), the first visual-field image updating unit 414 generates the image of the field of view to be updated from the initial point specified in Step S502 to the destination point specified in Step S504 (Step S506). Then, the first visual-field image updating unit 414 outputs, to the HMD 110, information relating to a updating mode of the image of the field of view to be updated from the initial point to the destination point as a result of executing Step S506. The HMD 110 receives this information to update the image of the field of view to be displayed on the display unit 112 (Step S507). When the visual field of the user is moved in the virtual space in synchronization with the movement of the HMD 110, VR motion sickness is less likely to result, and hence the image of the field of view to be updated from the initial point to the destination point is able to be displayed on the display unit 112 without further modification.

On the other hand, when the input determining unit 413 determines in Step S505 that the input in Step S503 is input for moving the virtual camera 300 without synchronization with the movement of the HMD 110 (that is, input from the external controller 140), the second visual-field image updating unit 415 generates the guiding region for attracting the sight line of the user together with the image of the field of view to be updated from the initial point specified in Step S502 to the destination point specified in Step S504 (Step S508). Then, the second visual-field image updating unit 415 outputs, to the HMD 110, information relating to a display mode of the sight line guiding region together with information relating to a updating mode of the image of the field of view to be updated from the initial point to the destination point as a result of executing Step S508. The HMD 110 receives those pieces of information to cause the display unit 112 to display the guiding region so as to cover a part of the virtual space in the field of view to be updated (Step S509).

FIG. 9 is at least one example of the image of the field of view and the guiding region that are displayed on the display unit of the HMD in Step S509.

The guiding region includes, for example, a blindfold object MO as illustrated in FIG. 9. The blindfold object MO is displayed so as to cover a part of an image of the field of view V to be continuously updated. For example, the blindfold object MO is displayed as a band portion at the center part of the image of the field of view V, but is not displayed at upper and lower portions of the image of the field of view V. The blindfold object MO attracts the sight line of the user. For example, an image (for example, a pattern) different from the image of the field of view V may be displayed. Examples of other configurations of the blindfold object MO are given below.

Some character information (advertisement or others) is displayed as a band-shaped blindfold object, in at least one embodiment.

In at least one embodiment, only the center portion of the image of the field of view is displayed, and the periphery excluding the center portion is covered with the blindfold object.

In at least one embodiment, the center portion of the image of the field of view is displayed in an enlarged manner, and the periphery excluding the center portion is covered with the blindfold object, to thereby give a visual effect as if the user is peering through a telescope.

In at least one embodiment, an image whose resolution or contrast is reduced as compared to that of the image of the field of view V remaining as a background is displayed in, for example, a center part of the image of the field of view V.

As described above, when the image of the field of view V is updated without synchronization with the movement of the HMD 110, the image of the field of view V and the blindfold object MO are displayed on the display unit 112 of the HMD 110 such that the blindfold object MO covers a part of the virtual space in the field of view V. In this manner, an amount of information that is recognized by the brain of the user from the image of the field of view V (background image) being updated is reduced. Therefore, the user's VR motion sickness is reduced in some instances. Further, the blindfold object MO is displayed so as not to cover the entire visual-field image V displayed on the display unit 112, but to cover a part of the field of view V. Therefore, the user can visually recognize at least a part of virtual space in the image of the field of view V subjected to update processing. Further, processing of changing the image of the field of view from a first-person perspective to a third-person perspective, e.g., processing of temporarily moving the virtual camera to a higher-perspective position, which has been performed in the related art to reduce the VR motion sickness is reduced or avoided. Therefore, the user's sense of immersion to the virtual space 200 maintained.

In at least one embodiment, the blindfold object MO is displayed so as to overlap with a part of the field of view particularly when the virtual camera 300 is moved backward in the virtual space, when the virtual camera 300 is moved at high speed, and when the virtual camera 300 is moved in a curved motion. The reason is because the VR motion sickness is particularly liable to occur in the case of those movements.

Further, the blindfold object MO is preferably displayed so as to cover a half or more of the field of view V displayed on the display unit 112. The blindfold object MO is further displayed so as to cover ⅔ or more of the field of view V. When the blindfold object MO is displayed large to some extent, the visual effect of attracting the sight line of the user can be sufficiently obtained, and thus the VR motion sickness can be reliably prevented or reduced.

Further, as illustrated in FIG. 10, the blindfold object MO is generated not only in the field of view V defined as an image of the field of view region of the virtual camera 300 in the virtual space 200, but also to have a size extending to a region outside of the field of view V. For example, the blindfold object MO may be generated to extend to a region of about ±90 degrees about the reference sight line of the virtual camera 300. With the extension of the blindfold object MO to the outside of the region of the field of view V, even when the direction of the virtual camera 300 is changed through movement of the head of the user during update of the field of view without synchronization with the movement of the HMD 110 in Step S509 corresponding to the second visual-field image update step, the blindfold object MO can be appropriately displayed also in the field of view V that has changed in synchronization with the movement of the HMD 110. In at least one embodiment, at least one object in the field of view V covered by the blindfold object MO is not rendered. Reducing a number of rendered objects in the field of view V helps to reduce power consumption.

In Step S505 of FIG. 8, even when the input determining unit 413 determines that the virtual camera 300 is moved without synchronization with the movement of the HMD 110, the blindfold object MO may not be displayed when the movement amount of the virtual camera 300 does not exceed a predetermined threshold. That is, the blindfold object MO may be displayed only when the movement amount of the virtual camera 300 exceeds the predetermined threshold. The reason is because, when the movement amount of the visual field is small, the VR motion sickness is less liable to occur even when the movement of the visual field out of synchronization with the movement of the HMD 110 is presented to the user.

Figure 11A:
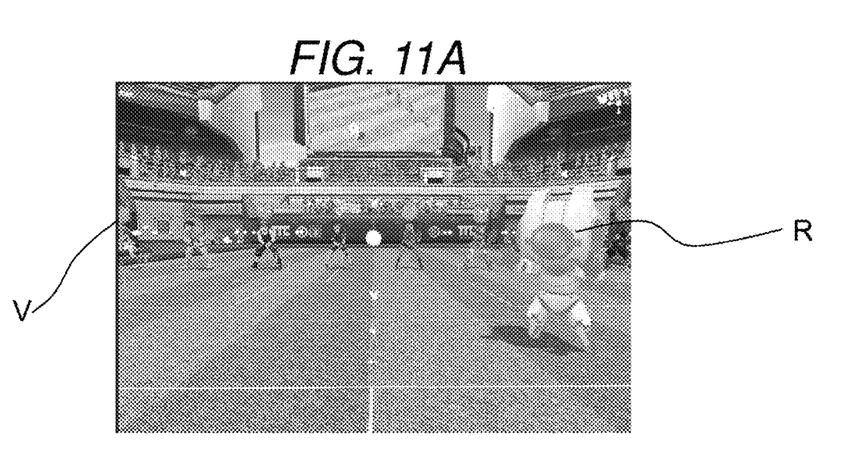
FIG. 11A, FIG. 11B, and FIG. 11C are diagrams of a display example of a sight line guiding region to be displayed on an HMD according to at least one example.
Figure 11B:
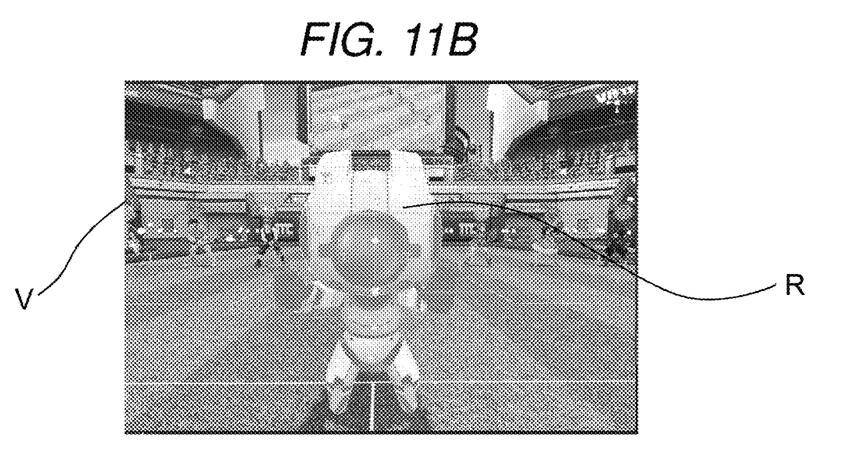
Figure 11C:
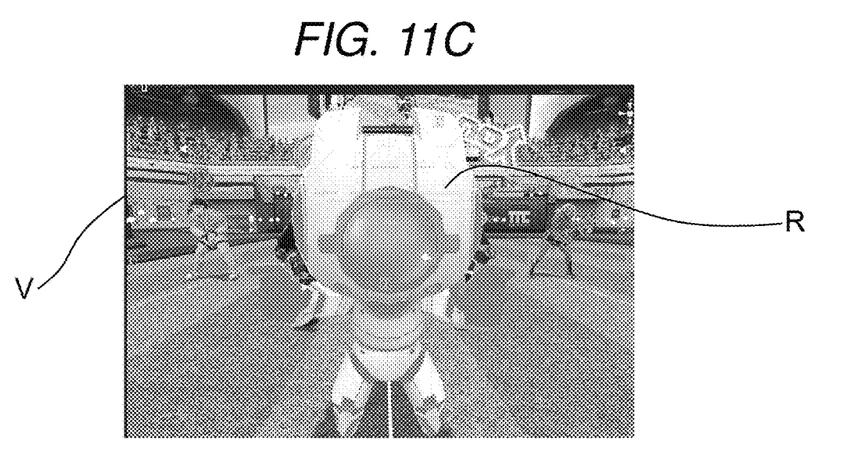
Figure 12:
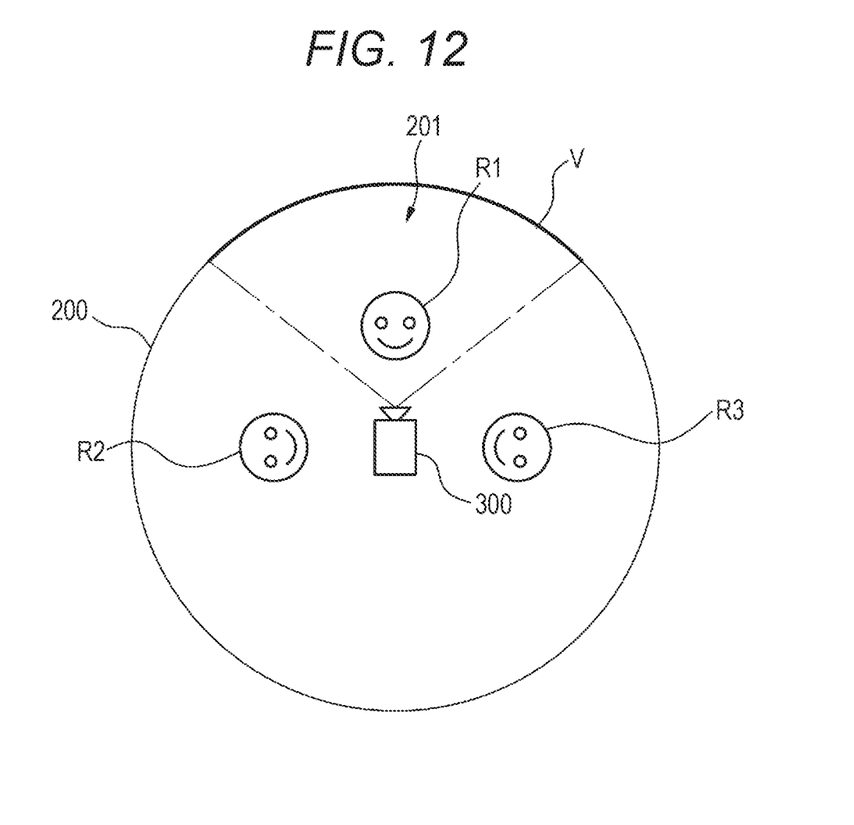
FIG. 12 is a diagram of an additional configuration of the sight line guiding region according to the at least one example shown in FIG. 11A to FIG. 11C.

FIG. 11A to FIG. 11C are diagrams of at least one example of the image of the field of view and the guiding region to be displayed on the display unit 112 in Step S510 corresponding to a guiding region display step. FIG. 12 is a diagram of a configuration of the guiding region according to the at least one example shown in FIG. 11A to FIG. 11C.

As shown in FIG. 11A to FIG. 11C, the guiding region may be formed of an object (in this case, a robot character object R) on which the sight line of the user is attracted. The processing of updating the image of the field of view with use of this object (character object R) is as follows.

When the input determining unit 413 determines that the input in Step S503 is input for moving the virtual camera 300 in synchronization with the movement of the HMD 110, the first visual-field image updating unit 414 updates the image of the field of view from the initial point to the destination point, and outputs the information relating to the updating mode of the image of the field of view to the HMD 110. The HMD 110 that has received the information relating to the updating mode of the image of the field of view updates the image of the field of view to be displayed on the display unit 112. In this case, the character object R is not generated or displayed.

On the other hand, when the input determining unit 413 determines that the input in Step S503 is input for moving the virtual camera 300 without synchronization with the movement of the HMD 110, the second visual-field image updating unit 415 generates the character object R together with the image of the field of view to be updated from the initial point specified in Step S502 to the destination point specified in Step S504. Then, the second visual-field image updating unit 415 outputs, to the HMD 110, the information relating to the display mode of the image of the field of view to be updated from the initial point to the destination point and the information relating to the updating mode of the character object R. The HMD 110 that has received the pieces of information relating to the updating modes of the image of the field of view and the character object R updates the image of the field of view while displaying the character object R on the display unit 112 as shown in FIG. 11A to FIG. 11C.

Specifically, the character object R comes into the field of view V from outside of the field of view V (FIG. 11A), and moves to the center portion of the field of view V (right in front of the user's eyes) (see FIG. 11B). Then, the character object R performs such a motion as to move the user from the initial point to the moving destination, and the image of the field of view V is updated in accordance with this movement of the character object R (FIG. 11C). For example, when the virtual camera 300 is moved forward, the image of the field of view is updated from the initial point to the destination point in accordance with the character object R performing a motion of pulling the user. Meanwhile, when the virtual camera 300 is moved backward, the image of the field of view is updated from the initial point to the destination point in accordance with the character object R performing such a motion as to push the user.

Further, when only the direction of the virtual camera 300 is changed (virtual camera is rotated), the image of the field of view is updated from the initial point to the destination point in accordance with the character object R performing such a motion as to rotate the user.

As described above, the character object R being the object is configured to give, to the user, such a visual effect that the user is moved in the virtual space 200 in a direction of change of the position and/or the direction of the virtual camera 300. According to at least one example, the user focuses his/her gaze on the moving character object R, and hence the amount of information that is recognized by the brain of the user from the image of the field of view being updated is reduced. Further, with the above-mentioned motion of the character object R, such a visual effect that the user himself/herself having a first-person perspective feels like being moved in the movement direction of the virtual camera 300 can be given. Therefore, the user's predictability for the update of the image of the field of view V is enhanced. Therefore, the user is less susceptible to the VR sickness. Further, the character object R is an object that does not cover the entire visual-field image V, but is displayed on a part of the image of the field of view V, and hence the user's sense of immersion to the virtual space 200 is maintained.

Further, as illustrated in FIG. 12, preferably the character object R is able to be displayed (arranged) not only in the field of view V defined as the image of the field of view region 201 of the virtual camera 300 in the virtual space 200, but also in a region outside of the field of view V. For example, one character object R1 may be able to be displayed in the field of view region 201 of the user, while one character object R2 and one character object R3 may be able to be displayed in a region outside of the field of view region 201 and in the vicinity of the field of view region 201. When the character objects R1 to R3 are able to be displayed not only in the image of the field of view V but also outside of the region of the image of the field of view V, even when the direction of the virtual camera 300 is changed through movement of the head of the user during update of the image of the field of view without synchronization with the movement of the HMD 110 in Step S509 corresponding to the second visual-field image update step, the character objects R2 and R3 can be appropriately displayed also in the image of the field of view V that has changed in synchronization with the movement of the HMD 110.

The above-mentioned embodiment are merely examples for facilitating an understanding of this disclosure, and does not serve to limit an interpretation of this disclosure. One of ordinary skill in the art would understand that this disclosure can be changed and modified without departing from the gist of this disclosure, and that this disclosure includes equivalents thereof.

What is claimed is:

1. A method comprising:
   defining a virtual space for immersing a user;
   identifying a sight line of the user;
   defining a field of view of a head mounted display (HMD) based on the sight line;
   receiving a signal for moving the field of view without synchronization with a detected movement of the HMD;
   moving the field of view based on the received signal;
   moving a guiding object such that the guiding object appears to exert a force on the user during the moving of the field of view, wherein the guiding object covers a part of the virtual space for guiding the sight line of the user during movement of the field of view, and the moving of the guiding object comprises moving the guiding object to the center of the field of view independent of a movement direction of the field of view; and displaying the image of the field and the guiding object of view on the head mounted display, wherein the moving the guiding object comprises introducing the guiding region into the field of view from outside of the field of view.

2. The method according to claim 1, wherein the moving the field of view comprises moving the field of view in a direction different from the sight line.

3. A method comprising:
defining a virtual space for immersing a user;
identifying a sight line of the user;
defining a field of view of a head mounted display (HMD) based on the sight line;
receiving a signal for moving the field of view without synchronization with a detected movement of the HMD;
moving the field of view based on the received signal;
moving a guiding object such that the guiding object appears to exert a force on the user during the moving of the field of view, wherein the guiding object covers a part of the virtual space for guiding the sight line of the user during movement of the field of view, and the moving of the guiding object comprises moving the guiding object to the center of the field of view independent of a movement direction of the field of view;
displaying the image of the field and the guiding object of view on the head mounted display; and
controlling the character object to appear to exert a force on a virtual camera in the virtual space, wherein a position of the virtual camera in the virtual space determines the field of view wherein the moving the guiding object comprises inserting a character object into the field of view.

4. The method according to claim 3, wherein the controlling the character object comprises controlling the character object based on the detected movement of the HMD.

5. The method according to claim 3, wherein the character object comprises a robot.

6. The method according to claim 3, further comprising maintaining the character object in the sight line of the user during an entire duration of the moving of the field of view.

7. A system comprising:
a head mounted display (HMD);
a non-transitory computer readable medium configured to store instructions thereon; and
a processor connected to the non-transitory computer readable medium, wherein the processor is configured to execute the instructions for:
defining a virtual space;
defining a field of view for the HMD;
changing the field of view for the HMD in a non-synchronized manner with respect to detected movement of the HMD;
inserting a guiding object into the field of view, wherein the guiding object covers at least half of the field of view, and the at least half of the field of view is measured from a center of the field of view; and
instructing the HMD to display the field of view including the guiding object on the HMD during the changing of the field of view in the non-synchronized manner.

8. The system according to claim 7, wherein processor is configured to execute the instructions for inserting the guiding object by introducing the guiding object into the field of view from outside of the field of view.

9. The system according to claim 8, wherein the processor is configured to execute the instructions for positioning the guiding object, after the introducing the guiding region into the field of view, in a sight line of a user of the HMD.

10. The system according to claim 9, wherein the processor is configured to execute the instructions for moving the field of view from a first region in the virtual space to a second region of the virtual space while the guiding object is positioned in the sight line.

11. The system according to claim 7, wherein the processor is configured to execute the instructions for inserting the guiding object by inserting a character object into the field of view.

12. The system according to claim 11, wherein the processor is configured to execute the instructions for controlling the character object to appear to exert a force on a virtual camera in the virtual space, wherein a position of the virtual camera in the virtual space determines the field of view.

13. The system according to claim 12, wherein the processor is configured to execute the instructions for controlling the character object by controlling the character object based on the detected movement of the HMD.

14. The system according to claim 11, wherein the processor is configured to execute the instructions for inserting the character object by inserting a robot.

15. The system according to claim 11, wherein the processor is configured to execute the instructions for maintaining the character object in a sight line of the user during an entire duration of the changing of the field of view in the non-synchronized manner.

16. A method comprising:
defining a virtual space, wherein the virtual space comprises a virtual camera, and a position of the virtual camera in the virtual space is determined based on a sight line of a user;
defining a field of view based on the position of the virtual camera in the virtual space;
receiving a first movement instruction for moving the virtual camera in the virtual space, wherein the first movement instruction indicates movement of the virtual camera in synchronization with a detected movement of a head mounted display (HMD) associated with the user;
moving the virtual camera in the virtual space based on the first movement instruction;
receiving a second movement instruction for moving the virtual camera in the virtual space, wherein the second movement instruction indicates movement of the virtual camera without synchronization with the detected movement of the HMD;
inserting, in response to the received second movement instruction, a character object into the field of view from outside of the field of view, wherein the character object is inserted into the line of sight of the user;
moving the virtual camera in the virtual space based on the second movement instruction, wherein the moving the virtual camera based on the first movement instruction comprises maintaining the character object in the field of view.

17. The method according to claim 16, wherein the moving the virtual camera in the virtual space based on the second movement instruction comprises controlling the character object to appear to exert a force on the virtual camera, and the force is determined based on the received second movement instruction.

\* \* \* \* \*